(12) United States Patent
Pagan (10) Patent No.: US 7,765,488 B2
(45) Date of Patent: Jul. 27, 2010

(54) SYSTEM AND COMPUTER-READABLE MEDIUM FOR ORDERING ON-SCREEN WINDOWS FOR DISPLAY

(75) Inventor: William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/130,951

(22) Filed: May 30, 2008

(65) Prior Publication Data

US 2008/0229237 A1  Sep. 18, 2008

Related U.S. Application Data

(63) Continuation of application No. 10/464,900, filed on Jun. 19, 2003, now abandoned.

(51) Int. Cl.
*G06F 3/048* (2006.01)
*G06F 3/00* (2006.01)

(52) U.S. Cl. .................. 715/790; 715/768; 715/794; 715/804; 715/858

(58) Field of Classification Search .................. 715/768, 715/790, 794, 797, 804, 858
See application file for complete search history.

(56) References Cited

U.S. PATENT DOCUMENTS

| | | | |
|---|---|---|---|
| 4,819,189 A | 4/1989 | Kikuchi et al. |
| 4,868,765 A | 9/1989 | Diefendorff |
| 5,046,001 A | 9/1991 | Barker et al. |
| 5,241,656 A | 8/1993 | Loucks et al. |
| 5,388,201 A | 2/1995 | Hourvitz et al. |
| 5,412,776 A | 5/1995 | Bloomfield et al. |
| 5,499,334 A | 3/1996 | Staab |
| 5,675,755 A | 10/1997 | Trueblood |
| 5,689,666 A | 11/1997 | Berquist et al. |
| 5,754,809 A | 5/1998 | Gandre |
| 5,786,818 A | 7/1998 | Brewer et al. |
| 5,790,127 A | 8/1998 | Anderson et al. |
| 5,805,163 A | 9/1998 | Bagnas |
| 5,825,360 A | 10/1998 | Odam et al. |
| 5,841,436 A | 11/1998 | Nakamura |
| 5,859,639 A | 1/1999 | Ebrahim |
| 5,892,511 A | 4/1999 | Gelsinger et al. |
| 5,933,843 A | 8/1999 | Takai |
| 5,949,432 A | 9/1999 | Gough |
| 5,995,103 A | 11/1999 | Ashe |
| 6,002,397 A | 12/1999 | Jaaskelainen, Jr. |
| 6,069,633 A | 5/2000 | Apparao et al. |
| 6,072,489 A | 6/2000 | Gough et al. |
| 6,246,407 B1 | 6/2001 | Wilks et al. |
| 6,252,595 B1 | 6/2001 | Birmingham et al. |
| 6,342,908 B1 | 1/2002 | Bates et al. |
| 6,356,281 B1 | 3/2002 | Isenman |

(Continued)

*Primary Examiner*—Steven B Theriault
(74) *Attorney, Agent, or Firm*—Cynthia G. Seal; Jeffrey L. Streets (57) ABSTRACT

A system for ordering on-screen windows for display is disclosed in which an active window partially overlaps an inactive window and hides a portion of the inactive window. The movement of a mouse pointer is monitored to determine its location on the screen. In response to the inactive window being selected with the mouse pointer, the inactive window is given focus to enable the inactive window to receive event signals even though a portion of the inactive window remains hidden, whereby original display depths of the windows is maintained.

18 Claims, 4 Drawing Sheets

U.S. PATENT DOCUMENTS

| | | |
|---|---|---|
| 6,429,883 B1 | 8/2002 | Plow et al. |
| 6,633,310 B1 | 10/2003 | Andrew et al. |
| 6,654,036 B1 | 11/2003 | Jones |
| 6,694,486 B2 | 2/2004 | Frank et al. |
| 6,915,490 B1 | 7/2005 | Ewing |
| 6,928,619 B2 | 8/2005 | Clow |
| 7,019,757 B2 | 3/2006 | Brown et al. |
| 2002/0175952 A1 | 11/2002 | Gajewska et al. |
| 2003/0184592 A1 | 10/2003 | Awada et al. |
| 2006/0184891 A1 | 8/2006 | Parker et al. |

Prior Art

SYSTEM AND COMPUTER-READABLE MEDIUM FOR ORDERING ON-SCREEN WINDOWS FOR DISPLAY

CROSS-REFERENCE TO RELATED APPLICATIONS

Under 35 USC §120, this application is a continuation application and claims the benefit of priority to U.S. patent application Ser. No. 10/464,900, filed Jun. 19, 2003, entitled "METHOD FOR ORDERING ON-SCREEN WINDOWS FOR DISPLAY", all of which is incorporated herein by reference.

BACKGROUND OF THE INVENTION

Almost all of today's personal computers are controlled by operating systems that have a window-based user interface. Most of these operating systems are capable of multitasking in which multiple programs execute simultaneously, and each program displays a window on a display screen for user interaction. The ability to resize application windows and change style and size of fonts are the significant advantages of a GUI versus a character-based interface. Window-based GUIs have become the standard way users interact with computers, and the major GUIs include Windows™ and Mac™ along with Motif for UNIX and the GNOME and KDE interfaces for Linux.

Figure 1:
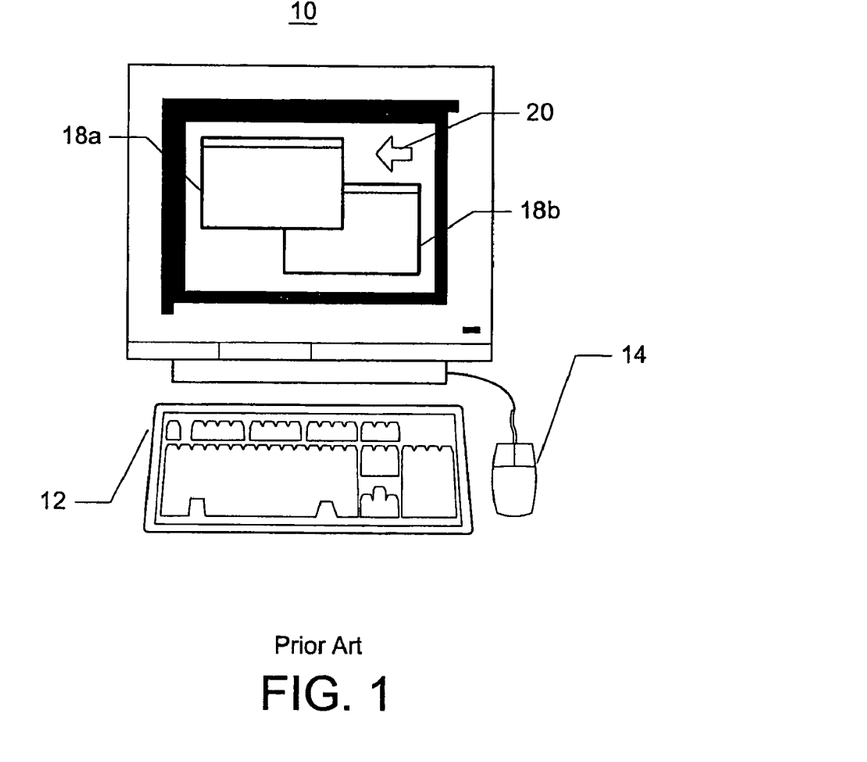
FIG. 1 is a block diagram illustrating a conventional computers system having a window-based user interface.

FIG. 1 is a block diagram illustrating a conventional computer system with a window-based user interface. As is well known, a typical personal computer (PC) system 10 includes a microprocessor and memory (not shown) for executing computer programs, various input devices, e.g., keyboard 12 and 5 mouse 14, and a display screen 16.

Depending on the number of computer programs running, the display screen 16 may display any number of open windows 18a and 18b (collectively referred to as windows 18), each awaiting user input. Example types of computer programs include spreadsheets, word processors, and Web browsers.

Depending on the arrangement and number of windows 18 displayed, it is common for the windows 18 to overlap so that some windows 18 partially or completely obscure other windows 18. To manage the display of windows 18, the operating system typically views the windows 18 as a stack and maintains an ordering of the windows 18 with respect to display depth.

The mouse 14, or other type of input device, may be used to move a mouse pointer 20 among the various windows 18. The user typically activates a particular window 18 by clicking the mouse pointer 20 anywhere on the window 18. When a window 18 is activated, I.e., becomes the active window 18a, it is displayed in its entirety on top of all other windows 18b and is the only window that can receive user input. The user typically interacts with the active window 18a by selecting or entering data in the window 18, or by selecting menu functions associated with the window 18.

Although windows 18 can be moved to open areas of the screen and/or resized, the current window management schema makes it difficult for user to juggle more than a very few windows 18 at a time without obscuring other windows 18 that are being used. When one window 18a that the user wishes to interact with is obscured by another, the user must take extra steps to return the window 18b to the forefront. This can be terribly annoying at times, particularly as the number of windows 18 being juggled increases.

One attempted solution to this problem is disclosed in U.S. Pat. No. 5,046,001, which describes a method for accessing selected windows in a multitasking system. In this method, user inputs are monitored to determine the position of a cursor, and as the cursor passes over each window, the window is automatically promoted to the top display position and made active. The problem this method, however, is that the user can quickly lose control of which windows are promoted to the top of the display. Consider for example, the situation where there are many tiled windows displayed and the user needs to move the cursor to the side of the display screen 16 to select a program icon. Assuming that the cursor passes over each of the tiled windows on its way to the icon, each of the windows would pop to the top of the display in quick succession whether the user wanted them to or not. Rearranging the depth order of the windows in this fashion without user consent could be distracting and annoying to the user in certain situations.

Accordingly, what is needed is an improved system for ordering on-screen windows. The system should retain the original depth ordering of the windows, but also allow inactive windows to be used as though they were active. The present invention addresses such a need.

SUMMARY OF THE INVENTION

The present invention provides a system for ordering onscreen windows for display in which an active window partially overlaps an inactive window and hides a portion of the inactive window. The movement of a mouse pointer is monitored to determine its location on the screen. In response to the inactive window being selected with the mouse pointer, the inactive window is given focus to enable the inactive window to receive event signals even though a portion of the inactive window remains hidden.

According to the system disclosed herein, the present invention enables a user to interact with inactive windows as though they were active without upsetting the original display depths of the windows. In addition, the user must physically select an inactive window to provide it focus before hidden parts of the inactive window can be made to appear, thereby overcoming the problems inherent in automatically bringing to the forefront any window that the mouse pointer passes over.

BRIEF DESCRIPTION OF THE DRAWINGS

FIGS. 7A and 78 are block diagrams illustrating the process of displaying hidden portions of the inactive window when one or more intervening windows are displayed between the active window and inactive window.

DETAILED DESCRIPTION OF THE INVENTION

The present invention relates to a system for managing the display of windows in a window-based computer system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides an improved system for managing windowbased environments that reduces the need for a user to mandate the position, dimensions, layered depth (i.e., the number of windows that a particular window is from being in the forefront, or the number of windows away that the particular window is from being the active window), and maximized/minimized status. The present invention accomplishes its objectives by changing what occurs when an inactive window is clicked, and how the window then behaves when the window is not in the forefront.

The present invention provides a mechanism that allows the user to interact with an inactive window as though the window was at the forefront without changing the relative display depths the windows. This mechanism is referred to as giving an inactive window focus and operates as follows. When the user moves the mouse pointer over an inactive window and clicks on a visible portion of the inactive window, the inactive window is given focus, meaning that the window receives even signals, even though the window is not the "active" window and displayed in the forefront. Once the window is given focus and the user passes the cursor over a hidden portion of the inactive window, the hidden portion of the inactive window is temporarily revealed on the display for user interaction. Once the user moves the cursor away this revealed portion of the window, that portion of the window returns to its hidden state. If the cursor is removed from within the boundaries of the inactive window, focus is automatically returned to the active window.

Thus, because the present invention requires the user to physically select an inactive window before focus is given to that window, the present invention does not suffer the problem of the method that automatically brings a window to the forefront when the mouse pointer is passed over the window. And because the window with focus is not automatically displayed in the forefront and its hidden portions are only temporarily revealed during a mouse pointer pass over, the present invention does not permanently change the relative display depths of the windows.

Figure 2:
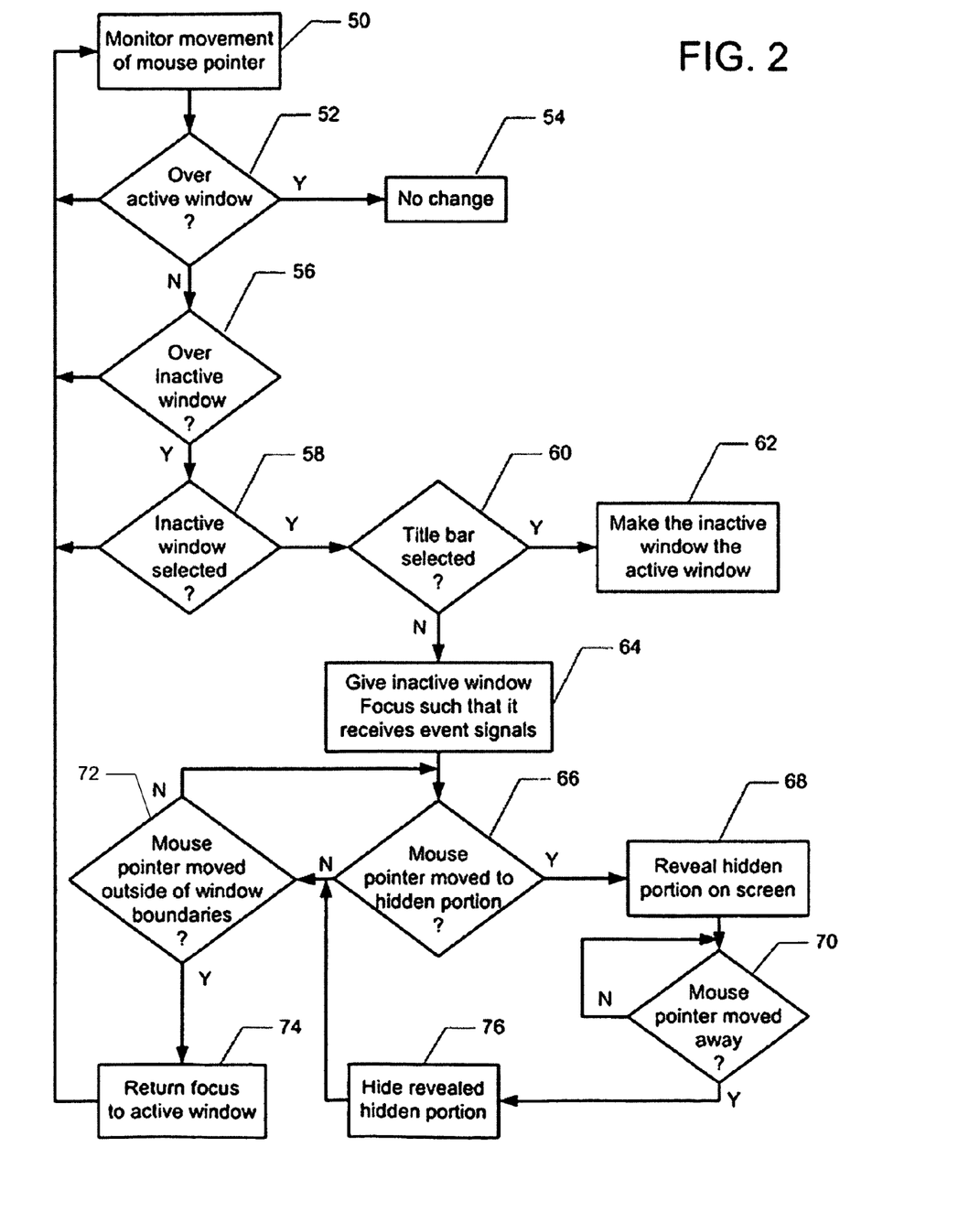
FIG. 2 is a flow chart illustrating a process for intelligently ordering onscreen windows for display in accordance with a preferred embodiment of the present invention.

FIG. 2 is a flow chart illustrating a process for intelligently ordering onscreen windows for display in accordance with a preferred embodiment of the present invention. The process will be explained at a base level where there is at least two open windows displayed on the screen 16, as shown in FIG. 3, which shows an active window 22 partially overlapping an inactive window 24 so that a portion 26 of the inactive window 24 is hidden by the active window 22.

Figure 3:
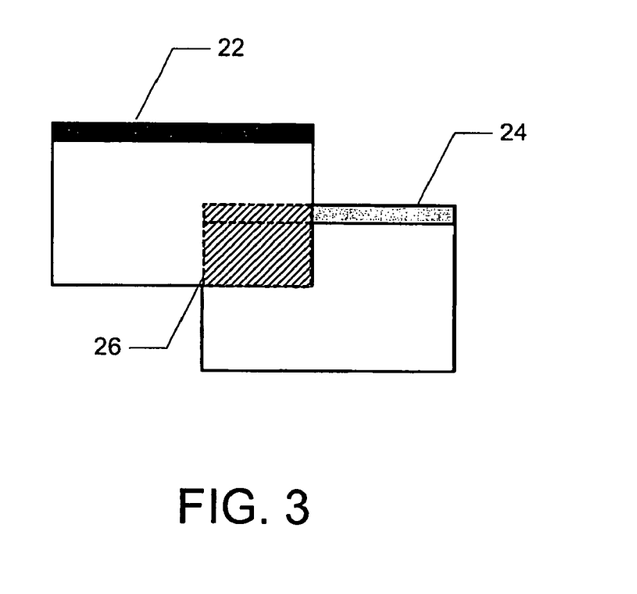
FIG. 3 is a block diagram showing two open windows displayed on the screen.

Referring to both FIGS. 2 and 3, the process begins in step 50 by monitoring the movement of the mouse pointer 20 across the screen 16 until the mouse pointer 20 is positioned over anyone of the open windows. It is then determined in step 52 if the mouse pointer 20 is over the active window 22. If so, no change is made in step 54. In step 56, it is determined if the cursor is positioned over any inactive window 24. If yes, then it is determined in step 58 whether the user has selected the inactive window 24. In a preferred embodiment, the user selects an inactive window 24 by clicking with the mouse 14 when the pointer 20 is over the window According to the present invention, when the user selects an inactive window 24 it must be determined whether the user wishes to make the inactive window 24 the active window, or rather give the inactive window focus so that it can receive user input, while the original depth ordering is maintained. In a preferred embodiment, the distinction is made in step 60 by determining whether the user selects the title bar of the inactive window 24, or instead selects any visible portion of the inactive window 24.

Figure 4:
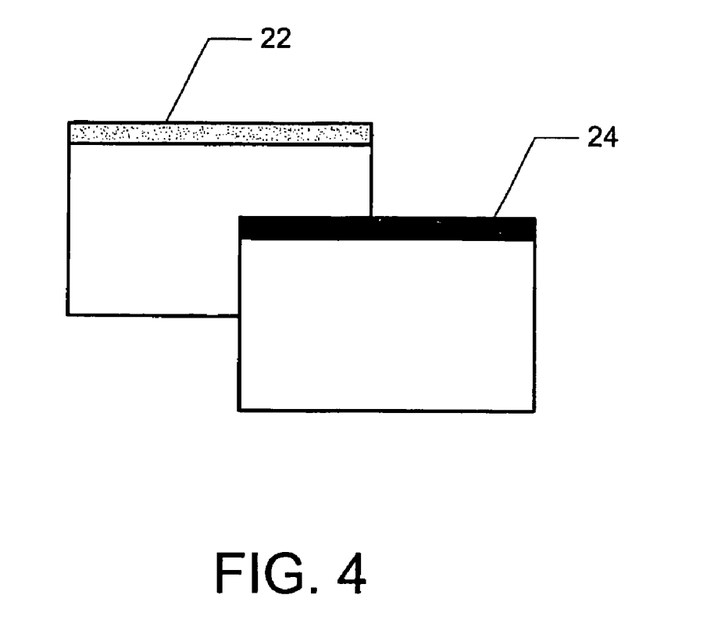
FIG. 4 is a block diagram showing an inactive window being made the active window and brought to the forefront of the screen.

If the user has selected the title bar, typically by clicking on it, then the inactive window 24 is made the active window in step 62 and brought to the forefront of the screen, as shown in FIG. 4.

Figure 5:
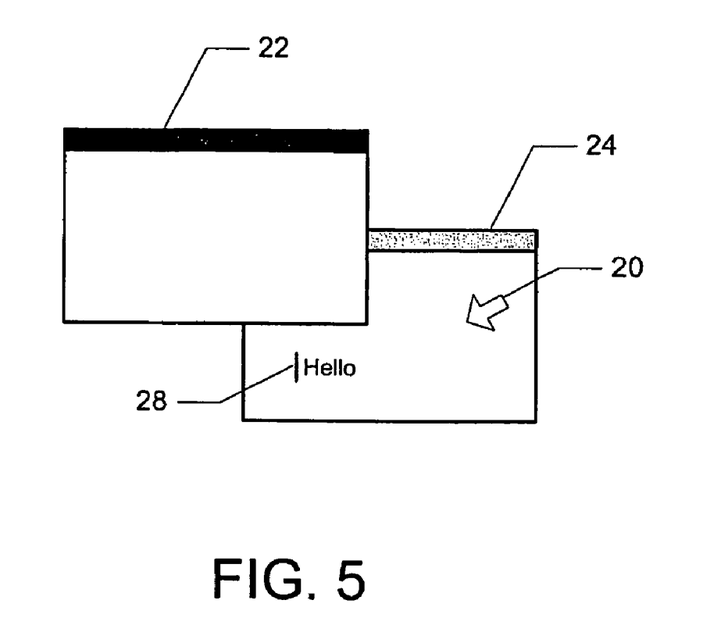
FIG. 5 is a block diagram illustrating the screen once the inactive window is given focus.

Referring again to FIG. 2, if the user has clicked on any visible portion of the inactive window 24, then in step 64, the inactive window 24 is given focus. FIG. 5 is a block diagram illustrating the screen 16 once the inactive window 24 is given focus. When the window 24 is given focus, the mouse pointer 20 and/or a cursor 28 are displayed in the window 24 and the window 24 receives all events signals from the user input devices, but the depth ordering of the windows remain unchanged so that some portions 26 of the inactive window 24 remain hidden.

Referring again to FIG. 2, once the window 24 is given focus, it is determined in step 66 whether the mouse pointer 20 is moved over a hidden portion 26 of the window 24. If the mouse pointer 20 has been moved over the hidden portion 26, then in step 68 the hidden portion 26 is revealed on the screen.

Figure 6:
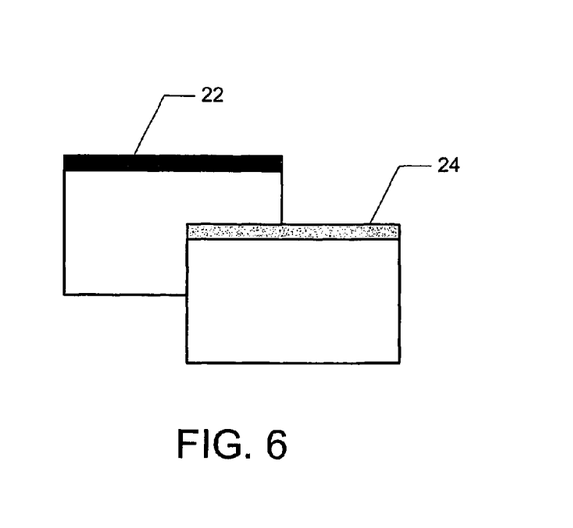
FIG. 6 is a block diagram illustrating the screen showing the once hidden portion of the inactive window being displayed in response to movement of the mouse pointer when the window has focus.

FIG. 6 is a block diagram illustrating the screen 16 showing the once hidden portion 26 of window 24 being displayed in response to movement of the mouse pointer 20 when the window 24 has focus. Once displayed, the once hidden portion 26 of window 24 is also able to receive even signals because all displayed areas of window 24 are given focus. Note, although the example shows all of window 24 being displayed, window 22 remains the active window, which is typically indicated by displaying a highlighted title bar in the active window 22 and displaying a grayed-out title bar in the inactive window 24. Referring again to FIG. 2, if it is determined that the mouse pointer 20 is moved away from the portion 26 of the window 24 that would normally be hidden in step 70, then that portion 26 of the window 24 is returned to its hidden state in step 76, as shown in FIG. 5. If the mouse pointer 20 is not moved away, then step 70 is repeated to keep checking. If the mouse pointer 20 is not moved over a hidden portion 26 in step 66, then in step 72 it is determined if the mouse pointer 20 is from within the boundaries of the inactive window 24. If yes, then in step 74, focus is automatically returned to the active window 22 and the movement of the mouse pointer 20 continues to be monitored. If the mouse pointer is not moved outside the boundaries of the inactive window 24, then the process continues by determining if the cursor passes over a hidden portion 26 of the inactive window 24 in step 66.

Figure 7A:
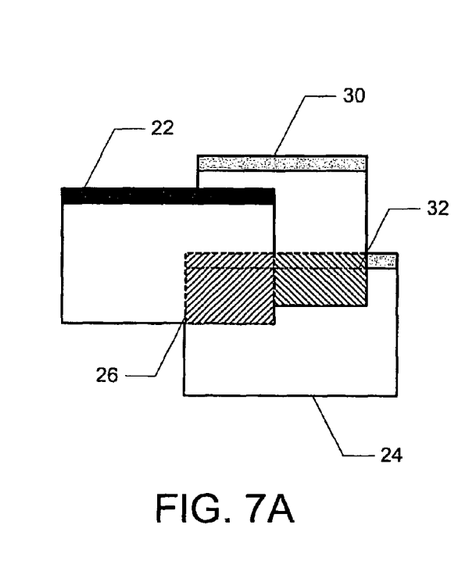
Figure 7B:
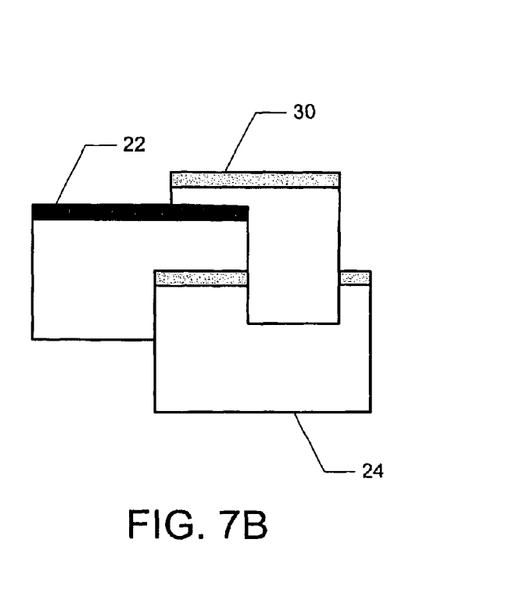

FIGS. 7A and 78 are block diagrams illustrating the process of displaying hidden portions of the inactive window 24 when one or more intervening windows are displayed between the active window 22 and inactive window 26. FIG. 7A shows an intervening window 30 between active window 22 and window 24, which currently has focus. The windows are positioned such that window 30 hides a portion 32 of window 24 that the active window 22 does not. FIG. 78 shows that if the mouse pointer 20 is moved to the portion 26 of the window 24 hidden by the active window 22, then only that hidden portion 26 of window 24 is displayed. The portion 32 hidden by window 30 remains hidden.

Should the mouse pointer 20 pass from portion 26 to portion 32, then portion 26 would return to its hidden state, and portion 32 would be displayed. A system for ordering on-screen windows has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

The invention claimed is:

1. A computer-readable medium containing computer program instructions for ordering on-screen windows for display, the computer program instructions, when executed, performing the steps of: displaying an active window and an inactive window on a display screen, the inactive window including a hidden portion and a visible portion, the active window overlapping all of the hidden portion of the inactive window and blocking all of the hidden portion of the inactive window from being viewed by a user; monitoring movement of a pointer displayed on the display screen, the movement of the pointer being controlled by the user through a pointing device; responsive to the user positioning the pointer over the visible portion of the inactive window and selecting the visible portion of the inactive window by clicking a button on the pointing device, enabling the visible portion of the inactive window to receive input from the user without changing a display depth of the inactive window relative to the active window, the pointer not being positioned over a title bar of the inactive window when the user selects the visible portion of the inactive window, the visible portion of the inactive window being enabled to receive input from the user while all of the hidden portion of the inactive window remains blocked from view by the active window, invisible to the user, and unable to receive input from the user; and, responsive to the visible portion of the inactive window being enabled to receive input from the user and responsive to the user re-positioning the pointer over the hidden portion of the inactive window, revealing the hidden portion of the inactive window such that all of the hidden portion of the inactive window is visible to the user without changing the display depth of the inactive window relative to the active window, and enabling all of the hidden portion of the inactive window to receive input from the user, the hidden portion of the inactive window remaining visible and able to receive input from the user only while the pointer is positioned over the hidden portion of the inactive window.

2. The medium of claim 1, wherein responsive to all of the hidden portion of the inactive window being revealed and enabled to receive input from the user, the method further comprises: responsive to the user re-positioning the pointer outside the hidden portion of the inactive window, returning all of the hidden portion of the inactive window to a state in which the hidden portion of the inactive window is blocked from view by the active window, invisible to the user, and unable to receive input from the user.

3. The medium of claim 1, wherein responsive to the visible portion of the inactive window being enabled to receive input from the user, the method further comprises: responsive to the user re-positioning the pointer outside the inactive window, disabling the visible portion of the inactive window from receiving input from the user.

4. The medium of claim 1, further comprising: displaying an intervening window on the display screen, the intervening window being displayed between the active window and the inactive window, overlapping all of a third portion of the inactive window, and blocking all of the third portion of the inactive window from being viewed by the user, wherein the third portion of the inactive window does not intersect the hidden portion of the inactive window, the visible portion of the inactive window being enabled to receive input from the user while all of the third portion of the inactive window remains blocked from view by the intervening window, invisible to the user, and unable to receive input from the user.

5. The medium of claim 4, wherein responsive to the visible portion of the inactive window being enabled to receive input from the user, the method further comprises: responsive to the user re-positioning the pointer over the hidden portion of the inactive window, revealing the hidden portion of the inactive window such that all of the hidden portion of the inactive window is visible to the user, and enabling all of the hidden portion of the inactive window to receive input from the user, the hidden portion of the inactive window being revealed and enabled to receive input from the user while all of the third portion of the inactive window remains blocked from view by the intervening window, invisible to the user, and unable to receive input from the user, the hidden portion of the inactive window remaining visible and able to receive input from the user only while the pointer is positioned over the hidden portion of the inactive window; and responsive to the user re-positioning the pointer over the third portion of the inactive window, revealing the third portion of the inactive window such that all of the third portion of the inactive window is visible to the user, and enabling all of the third portion of the inactive window to receive input from the user, the third portion of the inactive window being revealed and enabled to receive input from the user while all of the hidden portion of the inactive window remains blocked from view by the active window, invisible to the user, and unable to receive input from the user, the third portion of the inactive window remaining visible and able to receive input from the user only while the pointer is positioned over the third portion of the inactive window.

6. The medium of claim 5, wherein responsive to all of the hidden portion of the inactive window being revealed and enabled to receive input from the user, the method further comprises: responsive to the user re-positioning the pointer outside the hidden portion of the inactive window, returning all of the hidden portion of the inactive window to a state in which the hidden portion of the inactive window is blocked from view by the active window, invisible to the user, and unable to receive input from the user.

7. The method of claim 5, wherein responsive to all of the third portion of the inactive window being revealed and enabled to receive input from the user, the method further comprises: responsive to the user re-positioning the pointer outside the third portion of the inactive window, returning all of the third portion of the inactive window to a state in which the third portion of the inactive window is blocked from view by the intervening window, invisible to the user, and unable to receive input from the user.

8. A computer system for ordering on-screen windows for display, comprising: a display screen; a computer coupled to the display screen; and a computer program for displaying multiple windows on the display screen in which an active window partially overlaps an inactive window and hides a portion of the inactive window, the computer program having instructions for: displaying an active window and an inactive window on a display screen, the inactive window including a hidden portion and a visible portion, the active window overlapping all of the hidden portion of the inactive window and blocking all of the hidden portion of the inactive window from being viewed by a user; monitoring movement of a pointer displayed on the display screen, the movement of the pointer being controlled by the user through a pointing device; responsive to the user positioning the pointer over the visible portion of the inactive window and selecting the visible portion of the inactive window by clicking a button on the pointing device, enabling the visible portion of the inactive window to receive input from the user without changing a display depth of the inactive window relative to the active window, the pointer not being positioned over a title bar of the inactive window when the user selects the visible portion of the inactive window, the visible portion of the inactive window being enabled to receive input from the user while all of the hidden portion of the inactive window remains blocked from view by the active window, invisible to the user, and unable to receive input from the user; and, responsive to the visible portion of the inactive window being enabled to receive input from the user and responsive to the user re-positioning the pointer over the hidden portion of the inactive window, revealing the hidden portion of the inactive window such that all of the hidden portion of the inactive window is visible to the user without changing the display depth of the inactive window relative to the active window, and enabling all of the hidden portion of the inactive window to receive input from the user, the hidden portion of the inactive window remaining visible and able to receive input from the user only while the pointer is positioned over the hidden portion of the inactive window.

9. The system of claim 8, wherein responsive to all of the hidden portion of the inactive window being revealed and enabled to receive input from the user, the method further comprises: responsive to the user re-positioning the pointer outside the hidden portion of the inactive window, returning all of the hidden portion of the inactive window to a state in which the hidden portion of the inactive window is blocked from view by the active window, invisible to the user, and unable to receive input from the user.

10. The system of claim 8, wherein responsive to the visible portion of the inactive window being enabled to receive input from the user, the method further comprises: responsive to the user re-positioning the pointer outside the inactive window, disabling the visible portion of the inactive window from receiving input from the user.

11. The system of claim 8, further comprising: displaying an intervening window on the display screen, the intervening window being displayed between the active window and the inactive window, overlapping all of a third portion of the inactive window, and blocking all of the third portion of the inactive window from being viewed by the user, wherein the third portion of the inactive window does not intersect the hidden portion of the inactive window, the visible portion of the inactive window being enabled to receive input from the user while all of the third portion of the inactive window remains blocked from view by the intervening window, invisible to the user, and unable to receive input from the user.

12. The system of claim 11, wherein responsive to the visible portion of the inactive window being enabled to receive input from the user, the method further comprises: responsive to the user re-positioning the pointer over the hidden portion of the inactive window, revealing the hidden portion of the inactive window such that all of the hidden portion of the inactive window is visible to the user, and enabling all of the hidden portion of the inactive window to receive input from the user, the hidden portion of the inactive window being revealed and enabled to receive input from the user while all of the third portion of the inactive window remains blocked from view by the intervening window, invisible to the user, and unable to receive input from the user, the hidden portion of the inactive window remaining visible and able to receive input from the user only while the pointer is positioned over the hidden portion of the inactive window; and responsive to the user re-positioning the pointer over the third portion of the inactive window, revealing the third portion of the inactive window such that all of the third portion of the inactive window is visible to the user, and enabling all of the third portion of the inactive window to receive input from the user, the third portion of the inactive window being revealed and enabled to receive input from the user while all of the hidden portion of the inactive window remains blocked from view by the active window, invisible to the user, and unable to receive input from the user, the third portion of the inactive window remaining visible and able to receive input from the user only while the pointer is positioned over the third portion of the inactive window.

13. The system of claim 12, wherein responsive to all of the hidden portion of the inactive window being revealed and enabled to receive input from the user, the method further comprises: responsive to the user re-positioning the pointer outside the hidden portion of the inactive window, returning all of the hidden portion of the inactive window to a state in which the hidden portion of the inactive window is blocked from view by the active window, invisible to the user, and unable to receive input from the user.

14. The system of claim 12, wherein responsive to all of the third portion of the inactive window being revealed and enabled to receive input from the user, the method further comprises: responsive to the user re-positioning the pointer outside the third portion of the inactive window, returning all of the third portion of the inactive window to a state in which the third portion of the inactive window is blocked from view by the intervening window, invisible to the user, and unable to receive input from the user.

15. A computer-readable medium containing computer program instructions for ordering on-screen windows for display, the computer program instructions, when executed, performing the steps of: displaying a first window, a second window, and a third window on a display screen, the first window, the second window, and the third window having a depth ordering on the display screen such that the first window is on top, the third window is on bottom, and the second window is in between the first window and the third window,
    the first window being on top in the depth ordering on the display screen as the first window is an active window, a window on the display screen is made the active window in response to a user selecting a title bar of the window, only one window on the display screen can be the active window at any point in time, the third window including a first portion, a second portion, a third portion, the first portion of the third window being visible to the user and unable to receive input from the user, the second portion of the third window being blocked from view by the first window and unable to receive input from the user, the third portion of the third window being blocked from view by the second window and unable to receive input from the user, the first portion, the second portion, and the third portion of the third window excluding a title bar of the third window; monitoring movement of a pointer displayed on the display screen, the movement of the pointer being controlled by the user through a pointing device; responsive to the user positioning the pointer over the first portion of the third window and selecting the first portion of the third window by clicking a button on the pointing device, enabling the first portion of the third window to receive input from the user without changing the depth ordering of the first window, the second window, and the third window on the display screen, the first portion of the third window being enabled to receive input from the user while the second portion of the third window remains blocked from view by the first window and unable to receive input from the user, the first portion of the third window being enabled to receive input from the user while the third portion of the third window remains blocked from view by the second window and unable to receive input from the user; responsive to the first portion of the third window being enabled to receive input from the user and the user re-positioning the pointer over the second portion of the third window, revealing the second portion of the third window such that the second portion of the third window is visible to the user without changing the depth ordering of the first window, the second window, and the third window on the display screen, and enabling the second portion of the third window to receive input from the user, the second portion of the third window being visible and enabled to receive input from the user while the third portion of the third window remains blocked from view by the second window and unable to receive input from the user, the second portion of the third window remaining visible and enabled to receive input from the user only while the pointer is positioned over the second portion of the third window; responsive to the second portion of the third window being visible and enabled to receive input from the user and the user re-positioning the pointer outside the second portion of the third window, returning the second portion of the third window to a state in which it is blocked from view by the first window and unable to receive input from the user; responsive to the first portion of the third window being enabled to receive input from the user and the user re-positioning the pointer over the third portion of the third window, revealing the third portion of the third window such that the third portion of the third window is visible to the user without changing the depth ordering of the first window, the second window, and the third window on the display screen, and enabling the third portion of the third window to receive input from the user, the third portion of the third window being visible and enabled to receive input from the user while the second portion of the third window remains blocked from view by the first window and unable to receive input from the user, the third portion of the third window remaining visible and enabled to receive input from the user only while the pointer is positioned over the third portion of the third window; responsive to the third portion of the third window being visible and enabled to receive input from the user and the user re-positioning the pointer outside the third portion of the third window, returning the third portion of the third window to a state in which it is blocked from view by the second window and unable to receive input from the user; responsive to the first portion of the third window being enabled to receive input from the user and the user re-positioning the pointer outside the third window, returning the first portion of the third window to a state in which it is unable to receive input from the user.

16. The medium of claim 15, wherein responsive to the user positioning the pointer over the title bar of the third window and selecting the title bar of the third window by clicking the button on the pointing device, the method further comprises: making the third window the active window on the display screen; and changing the depth ordering on the display screen such that the third window is on top, the second window is on bottom, and the first window is in between the third window and the second window.

17. A computer system for ordering on-screen windows for display, comprising: a display screen; a computer coupled to the display screen; and a computer program for displaying multiple windows on the display screen in which an active window partially overlaps an inactive window and hides a portion of the inactive window, the computer program having instructions for: displaying a first window, a second window, and a third window on a display screen, the first window, the second window, and the third window having a depth ordering on the display screen such that the first window is on top, the third window is on bottom, and the second window is in between the first window and the third window, the first window being on top in the depth ordering on the display screen as the first window is an active window, a window on the display screen is made the active window in response to a user selecting a title bar of the window, only one window on the display screen can be the active window at any point in time, the third window including a first portion, a second portion, a third portion, the first portion of the third window being visible to the user and unable to receive input from the user, the second portion of the third window being blocked from view by the first window and unable to receive input from the user, the third portion of the third window being blocked from view by the second window and unable to receive input from the user, the first portion, the second portion, and the third portion of the third window excluding a title bar of the third window; monitoring movement of a pointer displayed on the display screen, the movement of the pointer being controlled by the user through a pointing device; responsive to the user positioning the pointer over the first portion of the third window and selecting the first portion of the third window by clicking a button on the pointing device, enabling the first portion of the third window to receive input from the user without changing the depth ordering of the first window, the second window, and the third window on the display screen, the first portion of the third window being enabled to receive input from the user while the second portion of the third window remains blocked from view by the first window and unable to receive input from the user, the first portion of the third window being enabled to receive input from the user while the third portion of the third window remains blocked from view by the second window and unable to receive input from the user; responsive to the first portion of the third window being enabled to receive input from the user and the user re-positioning the pointer over the second portion of the third window, revealing the second portion of the third window such that the second portion of the third window is visible to the user without changing the depth ordering of the first window, the second window, and the third window on the display screen, and enabling the second portion of the third window to receive input from the user, the second portion of the third window being visible and enabled to receive input from the user while the third portion of the third window remains blocked from view by the second window and unable to receive input from the user, the second portion of the third window remaining visible and enabled to receive input from the user only while the pointer is positioned over the second portion of the third window; responsive to the second portion of the third window being visible and enabled to receive input from the user and the user re-positioning the pointer outside the second portion of the third window, returning the second portion of the third window to a state in which it is blocked from view by the first window and unable to receive input from the user; responsive to the first portion of the third window being enabled to receive input from the user and the user re-positioning the pointer over the third portion of the third window, revealing the third portion of the third window such that the third portion of the third window is visible to the user without changing the depth ordering of the first window, the second window, and the third window on the display screen, and enabling the third portion of the third window to receive input from the user, the third portion of the third window being visible and enabled to receive input from the user while the second portion of the third window remains blocked from view by the first window and unable to receive input from the user, the third portion of the third window remaining visible and enabled to receive input from the user only while the pointer is positioned over the third portion of the third window; responsive to the third portion of the third window being visible and enabled to receive input from the user and the user re-positioning the pointer outside the third portion of the third window, returning the third portion of the third window to a state in which it is blocked from view by the second window and unable to receive input from the user; responsive to the first portion of the third window being enabled to receive input from the user and the user re-positioning the pointer outside the third window, returning the first portion of the third window to a state in which it is unable to receive input from the user.

18. The system of claim 17, wherein responsive to the user positioning the pointer over the title bar of the third window and selecting the title bar of the third window by clicking the button on the pointing device, the method further comprises: making the third window the active window on the display screen; and changing the depth ordering on the display screen such that the third window is on top, the second window is on bottom, and the first window is in between the third window and the second window.

* * * * *